United States Patent [19]
Lee

[11] Patent Number: 5,982,467
[45] Date of Patent: Nov. 9, 1999

[54] METHOD OF MANUFACTURING LIQUID CRYSTAL DISPLAY INCLUDING ACTIVE PANEL

[75] Inventor: Seong Su Lee, Kyunggi-do, Rep. of Korea

[73] Assignee: LG Electronics, Seoul, Rep. of Korea

[21] Appl. No.: 08/939,813

[22] Filed: Sep. 29, 1997

[30] Foreign Application Priority Data

Dec. 30, 1996 [KR] Rep. of Korea ............... 96-77958

[51] Int. Cl.⁶ .................................................. G02F 1/1333
[52] U.S. Cl. ............................................ 349/138; 349/46
[58] Field of Search ............................... 349/42, 46, 122, 349/138; 257/59

[56] References Cited

U.S. PATENT DOCUMENTS

| | | | |
|---|---|---|---|
| 5,055,899 | 10/1991 | Wakai et al. | 349/138 |
| 5,334,860 | 8/1994 | Naito | 349/46 |
| 5,731,856 | 3/1998 | Kim et al. | 349/43 |

*Primary Examiner*—William L. Sikes
*Assistant Examiner*—James Dudek
*Attorney, Agent, or Firm*—Morgan, Lewis & Bockius LLP

[57] ABSTRACT

A method for manufacturing a liquid crystal display includes the steps of forming a gate bus line on a substrate by using a first metal, forming a gate electrode, a second gate bus line and a gate pad on the substrate, by using a second metal, forming a gate insulating layer on the substrate including the gate bus line, the gate electrode, the gate pad and the second gate bus line, by using a first insulating material, selectively forming a semiconductor layer and an impure semiconductor layer on the gate insulating layer, forming a source electrode, a drain electrode, a source bus line and a source pad on the substrate including the impure semiconductor layer, by using a third metal, removing a portion of the impure semiconductor layer exposed between the source electrode and the drain electrode by etching, using the source electrode and the drain electrode as masks, forming a protection layer on the substrate including the source electrode and the drain electrode, by using a second insulating material, forming a drain contact hole on the drain electrode, a source pad contact hole on the source pad and a gate pad contact hole on the gate pad, and forming a pixel electrode on the substrate having the protection layer, using a conductive material.

9 Claims, 11 Drawing Sheets

METHOD OF MANUFACTURING LIQUID CRYSTAL DISPLAY INCLUDING ACTIVE PANEL

This application claims the benefit of Korean Application NO. 96-77958 filed on Dec. 30, 1996, which is hereby incorporated by reference.

BACKGROUND OF THE INVENTION

1. Field of the Invention

The present invention relates to an active matrix liquid crystal display (AMLCD) including an active panel with thin film transistors (TFT) and pixel electrodes arranged in a matrix pattern, and more particularly, to a simplified method of manufacturing the active panel in the AMLCD.

2. Discussion of the Related Art

Among display devices for showing visual images on a screen, thin film type flat panel display devices are highly favored because of their light weight and easy adaptability. Especially, active research activities have focused on the development of liquid crystal display devices because of their high resolution and fast response time suitable for display of motion picture images.

A liquid crystal display device works by using polarization and optical anisotrophy of a liquid crystal. By controlling the orientation of liquid crystal molecules having rod shape through polarization technique, transmission and interception of a light through the liquid crystal are achieved due to the anisotrophy of the liquid crystal. This principle is applied to the liquid crystal display device. AMLCDs having TFTs arranged in a matrix pattern and pixel electrodes connected to the TFTs provide high quality images and are now widely used. The structure of a conventional AMLCD will now be described.

A color filter panel of an LCD includes a sequential arrangement of red, blue and green color filters on a transparent substrate at pixel positions designed in a matrix pattern. Among these color filters, black matrixes are formed in a lattice pattern. On the color filters, a common electrode is formed.

An active panel of an LCD includes pixel electrodes designed in a matrix pattern and formed on a transparent substrate. Along the column direction of the pixel electrodes, signal bus lines are formed, and along the row direction of the pixel electrodes, data bus lines are formed. At a corner of a pixel electrode, a TFT for driving the pixel electrode is formed. A gate electrode of the TFT is connected with a signal bus line (or a gate bus line). A source electrode of a TFT is connected with a data bus line (or a source bus line). Additionally, a storage capacitor electrode may be formed in parallel with the gate bus line and crossing the pixel electrode. A pad is formed at the end portion of each bus line.

The color filter panel and the active panel are bonded together with a certain distance therebetween (i.e., a cell gap) to face each other. Liquid crystal material fills the cell gap to complete a liquid crystal panel of an LCD.

The method of manufacturing a liquid crystal display device is very complicated including many processes combined together. The method of manufacturing an active panel having TFTs and pixel electrodes is even more complicated. Therefore, it is important to simplify the method for manufacturing an active panel to reduce the possibility of defects during the manufacture process.

Figure 1:
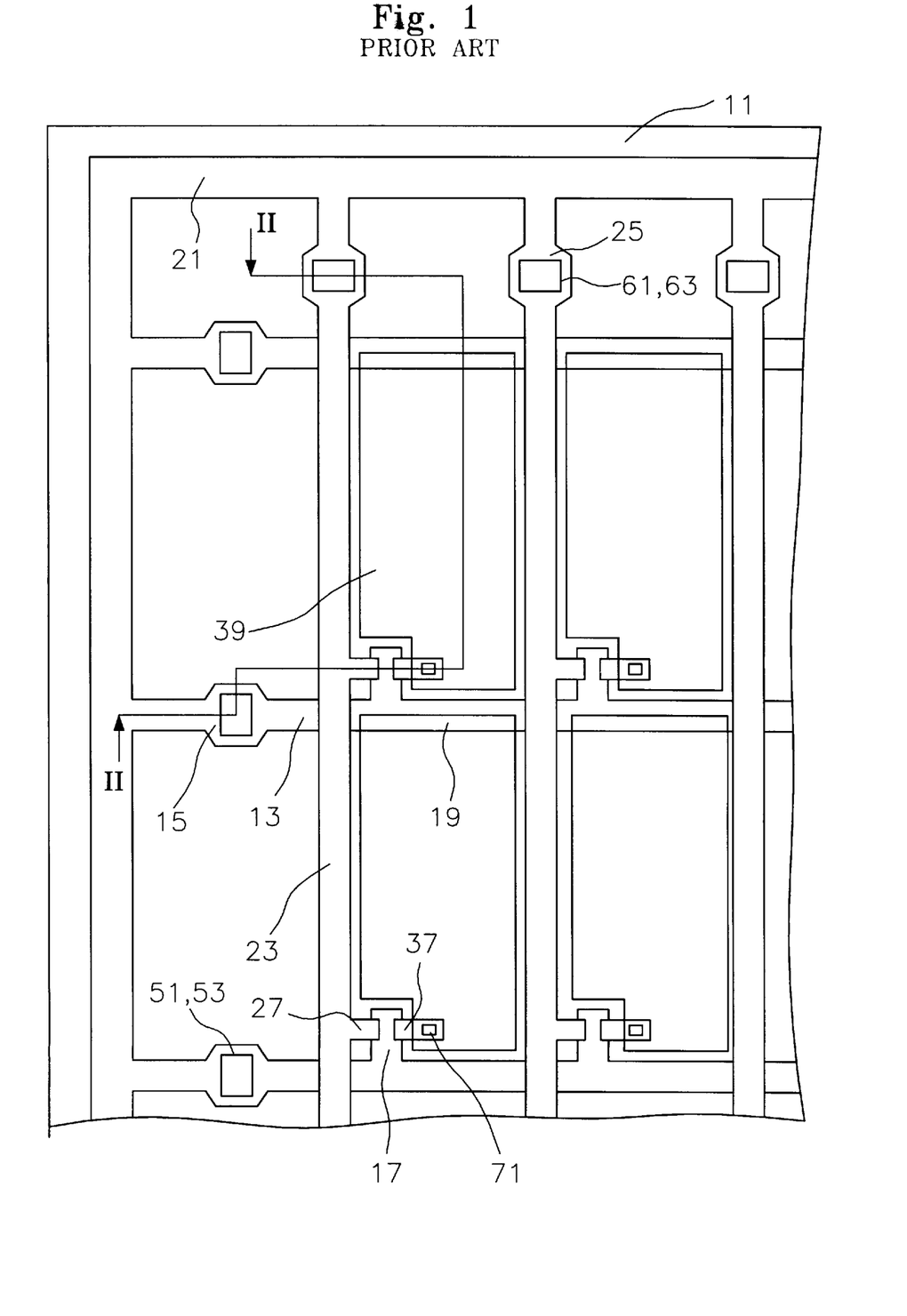
FIG. 1 is an enlarged plan view showing a part of an active panel of a conventional liquid crystal display device.

A conventional method for manufacturing an active panel is described with reference to FIG. 1 showing a plan view of an active panel, and FIGS. 2A–2H showing cross-sectional views taken along line II—II of FIG. 1.

Figure 2A:
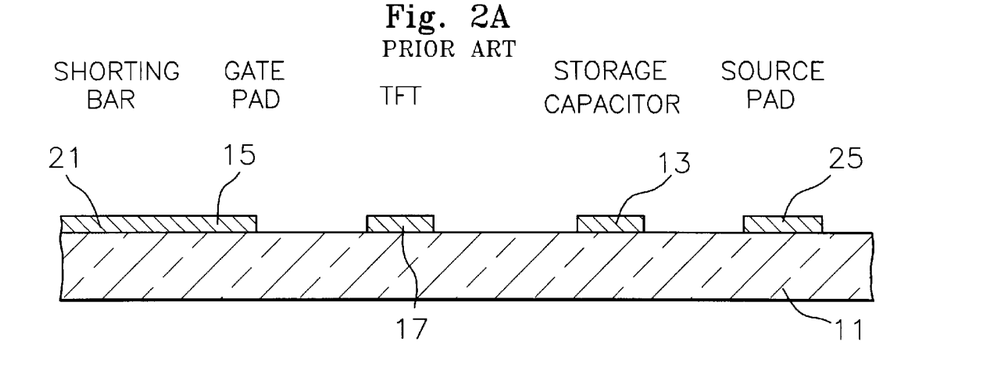
FIGS. 2A–2H are cross-sectional views showing the steps of manufacturing an active panel of a conventional liquid crystal display device.

As shown in FIGS. 1 and 2A, aluminum or aluminum alloy is vacuum deposited on a transparent substrate 11 and patterned by using a first mask to form gate bus lines 13, gate pads 15, gate electrodes 17, source pads 25 and a shorting bar 21. The gate bus line 13 connects gate electrodes 17 disposed in a column direction. The gate pad 15 is disposed at the end of the gate bus line 13. The shorting bar 21 makes a connection between the gate pad 15 and the source pad 25 and surrounds the periphery of the substrate 11. The source pad 25 is formed at the end portion of source bus lines 23 which are to be formed later. Here, the gate bus line 13 may be used for forming a storage capacitor electrode.

Figure 2B:
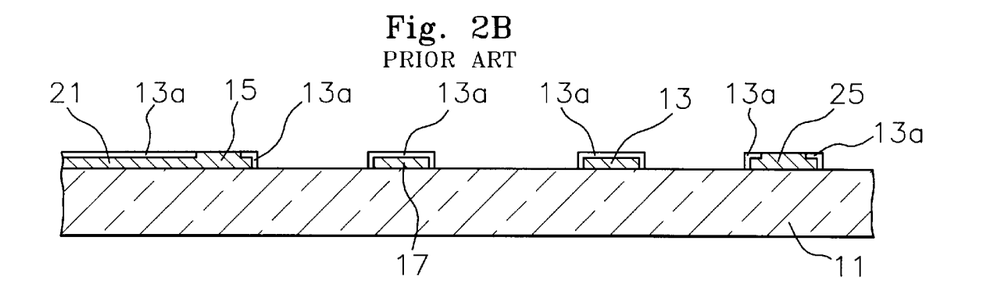

As shown in FIG. 2B, using the shorting bar 21 as an anode for anodizing, the elements formed of metal as described above are anodized to form an anodic oxide film 13a on the surface. This is to prevent a hill-lock on the aluminum surface. Since the gate electrode 17, gate pad 15, gate bus line 13 and source pad 25 are connected with the shorting bar 21, connection of the shorting bar 21 with an anode facilitates the anodizing of the elements. Here, the gate pad 15 and the source pad 25 are covered by using a second mask in order not to form an anodic oxide film on their surfaces.

Figure 2C:
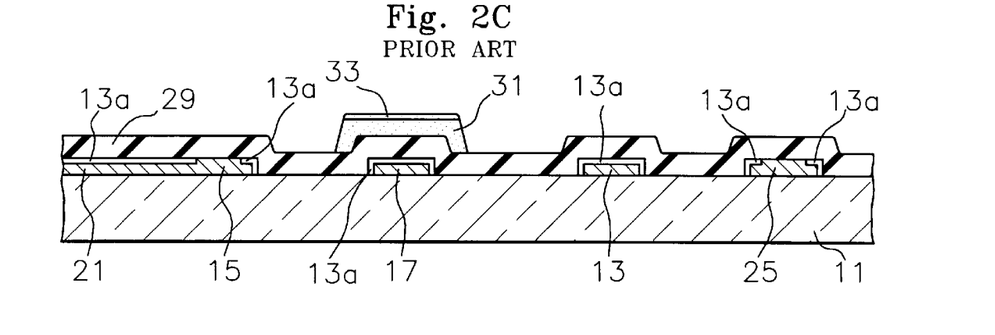

As shown in FIG. 2C, silicone oxide or silicone nitride is vacuum deposited on the substrate including the lines and pads to form a gate insulating layer 29. Then, an intrinsic semiconductor material and an impure semiconductor material are deposited sequentially and patterned by using a third mask to form a semiconductor layer 31 and an impure semiconductor layer 33.

Figure 2D:
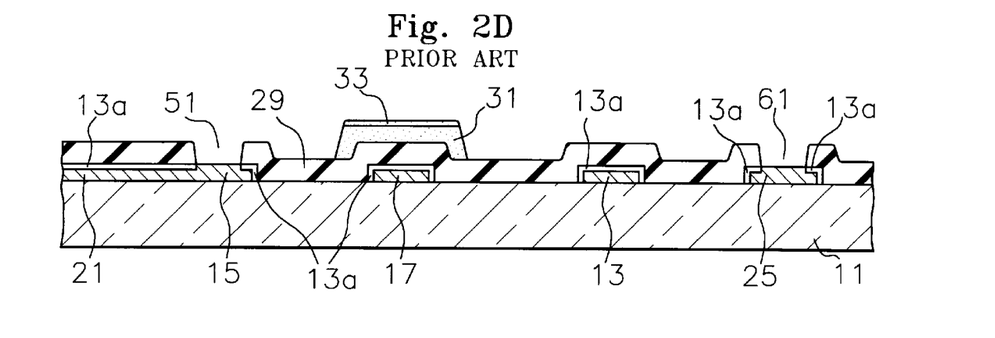

As shown in FIG. 2D, a first gate contact hole 51 on the gate pad 15 and a first source contact hole 61 on the source pad 25 are formed by using a fourth mask. Here, the contact holes 51 and 61 expose a portion of the gate pad and a portion of the source pad, respectively, which are not anodized.

Figure 2E:
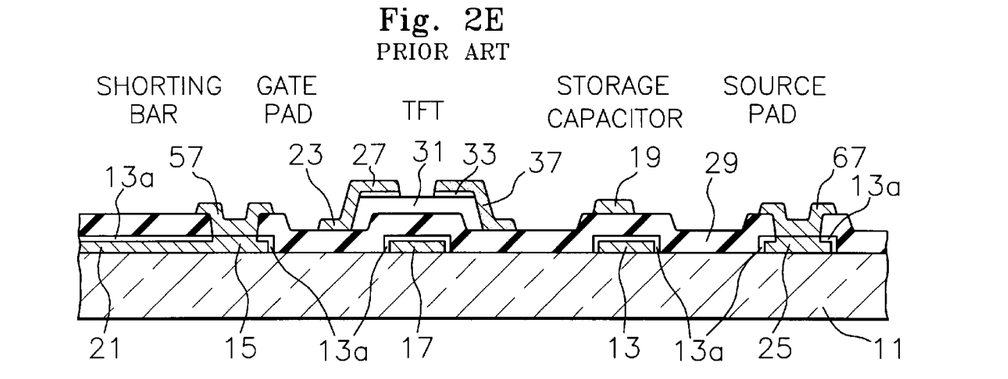

As shown in FIG. 2E, Chromium or chromium alloy is vacuum deposited and patterned by using a fifth mask to form a source electrode 27, a drain electrode 37 and source bus lines 23 on the impure semiconductor layer 33. In addition, chromium or chromium alloy is also deposited on the gate pad 15 and source pad 25. The first source contact hole 61 connects the source bus line 23 with the source pad 25. Here, the chromium layer on the source pad is to protect the aluminum layer underneath and is used as an source pad intermediate electrode 67 to connect with a source pad connection terminal 65 which is to be formed later. Similarly, the chromium layer on the gate pad 15 connects the aluminum layer and a gate pad connection terminal 55, which is to be formed later, through the first gate contact hole 51 forming a gate pad intermediate electrode 57. The exposed portion of the impure semiconductor 33 between the source electrode 27 and drain electrode 37 is removed by using the source electrode 27 and drain electrode 37 as masks.

When it is necessary to form a storage capacitor electrode 19, the storage capacitor electrode 19 in (n)th row is formed to overlap the gate line 13 in (n−1)th row.

Figure 2F:
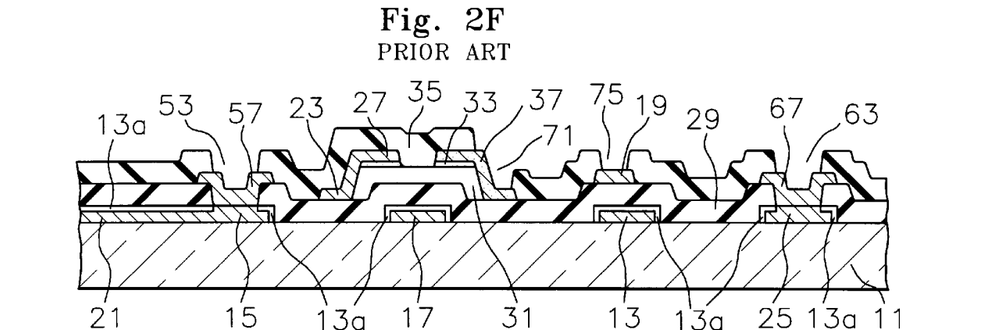

Next, as shown in FIG. 2F, an insulating material, such as silicone oxide or silicone nitride, is vacuum deposited on the substrate including the source electrode 27 and drain electrode 37 to form a protection layer 35. The protection layer 35 is patterned by using a sixth mask to form a second gate contact hole 53 on the gate pad 15, a second source contact hole 63 on the source pad 25, and a drain contact hole 71 on the drain electrode 37. The gate pad 15 is connected with an external terminal through the second gate contact hole 53, the source pad 25 is connected with an external terminal through the second source contact hole 63, and the drain electrode 37 is connected with a pixel electrode 39 (to be formed later) through the drain hole 71.

In case of forming the storage capacitor electrode 19, the protection layer 35 over the storage capacitor electrode 19 is removed to form a storage capacitor contact hole 75, through which the storage capacitor electrode 19 is connected with the pixel electrode 39.

Figure 2G:
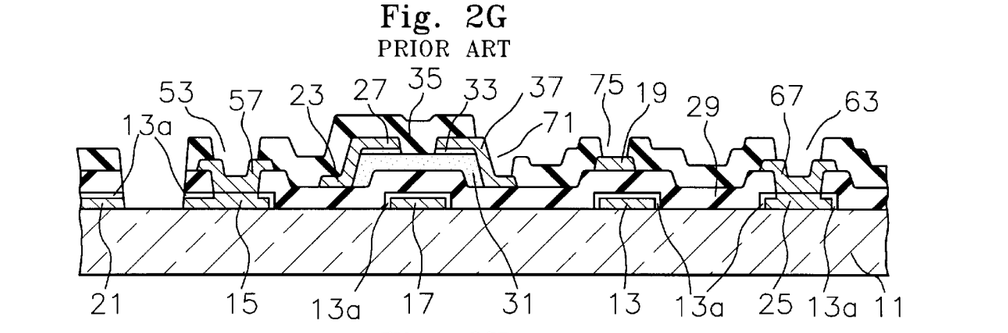

As shown in FIG. 2G, part of the shorting bar 21, which is made of aluminum and connected to the gate bus line 13, the gate electrode 17, the gate pad 15 and the source pad 25, is removed to complete the final structure of the active panel by using a seventh mask.

Figure 2H:
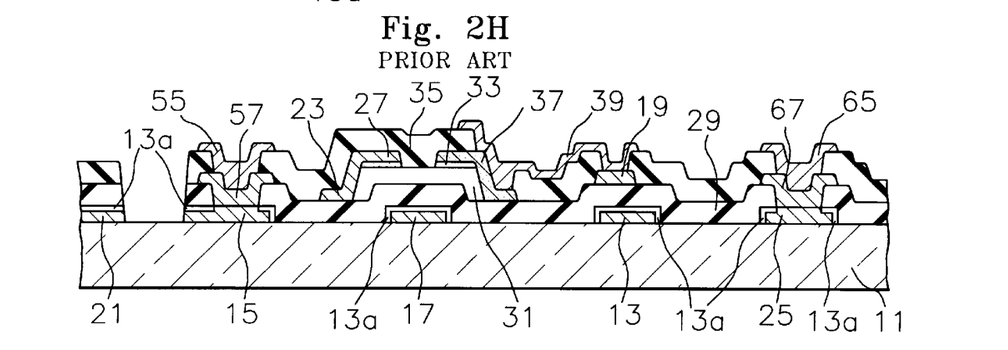
Figure 3:
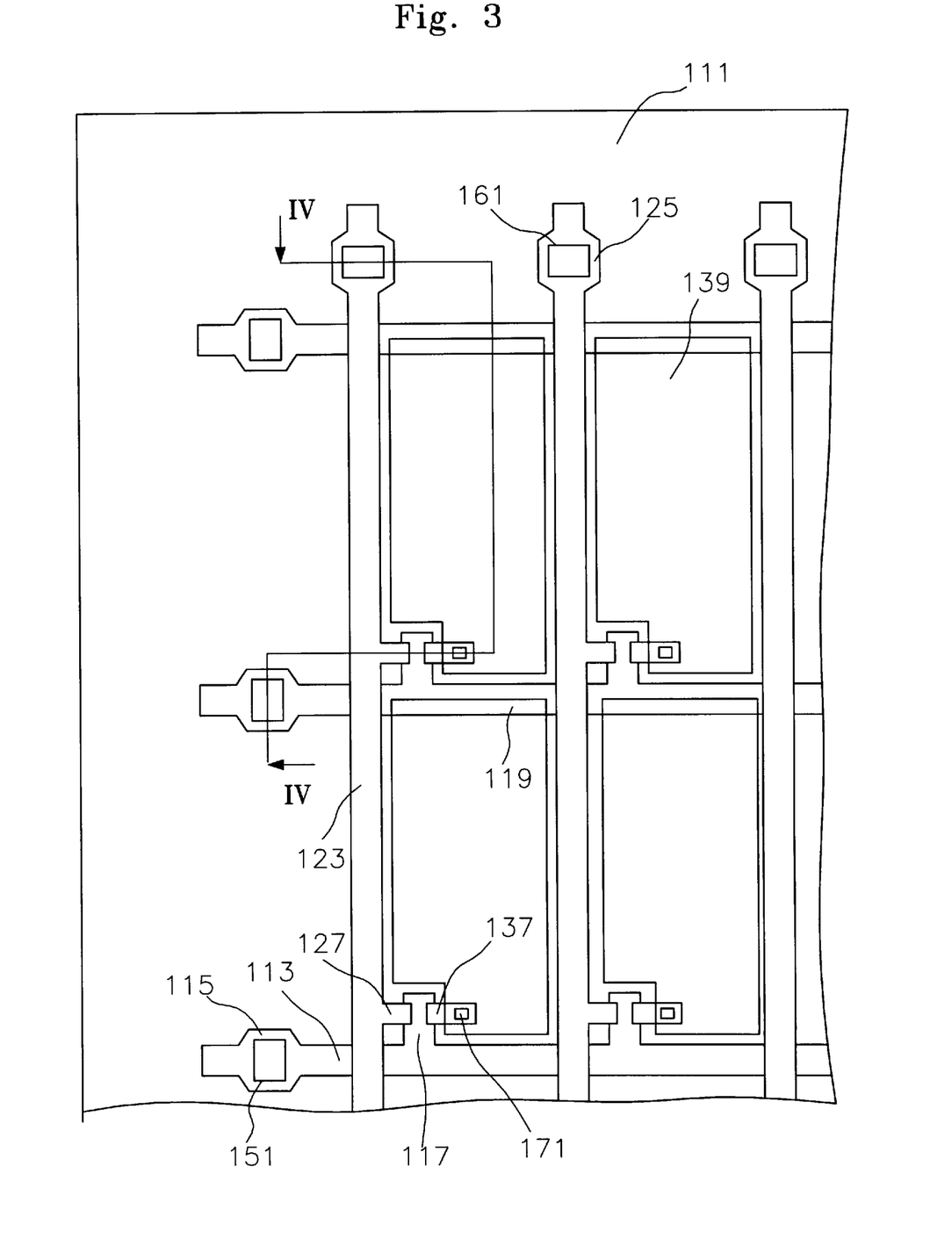
FIG. 3 is an enlarged plan view showing a part of an active panel of a liquid crystal display device according to a first embodiment of the present invention.

As shown in FIG. 2H, indium-tin oxide is vacuum deposited on the surface including the protection layer 35 and patterned by using an eighth mask to form pixel electrodes 39, gate pad connection terminals 55 and source pad connection terminals 65.

As described above, eight masks are used during the formation of the active panel. The more mask steps are used, the worse the quality of the LCD is likely to be. Moreover, the patterning process including the masking steps generally takes a relatively long time. Therefore, elimination of even one mask step can reduce the cost and increase the production yield.

SUMMARY OF THE INVENTION

Accordingly, the present invention is directed to a liquid crystal display and method that substantially obviates one or more of the problems due to the limitations and disadvantages of the related art.

An object of the present invention is to provide a method of manufacturing an LCD with less masking steps by eliminating the step of anodizing the gate electrode and the gate bus lines.

Another object of the present invention is to provide an LCD with reduced accumulated error in the mask arrangement.

Another object of the present invention is to provide an LCD with increased production yield and enhanced quality.

A further object of the present invention is to provide an LCD with reduced processing time and cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as appended drawings.

To achieve these and other advantages and in accordance with the purpose of the present invention, as embodied and broadly described, a method of manufacturing a liquid crystal display device includes the steps of forming a gate bus line on a substrate, using a first metal; forming a gate electrode, a second gate bus line and a gate pad on the substrate having the gate bus line, using a second metal; forming a gate insulating layer on the substrate having the gate bus line, the gate electrode, the gate pad and the second gate bus line, using a first insulating material; forming a semiconductor layer and impure semiconductor layer on the gate insulating layer; forming a source electrode, a drain electrode, a source bus line and a source pad on the substrate having the impure semiconductor layer, using a third metal; removing a portion of the impure semiconductor layer exposed between the source and the drain electrode by etching, using the source and the electrode as masks; forming a protection layer on the substrate having the source and the drain electrode, using a second insulating material; forming a drain contact hole on the drain electrode, a source pad contact hole on the source pad and a gate pad contact hole on the gate pad; and forming a pixel electrode on the substrate having the protection layer, using a conductive material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

In the manufacture of an active panel of a liquid crystal display according to the present invention, the number of mask steps are reduced to six steps. In order to achieve this, the method according to the present invention eliminates the anodizing process. As a result, it is not necessary to form a shorting bar and cut the shorting bar. In addition, a source pad is formed during the step of forming a source bus line instead of the step of forming a gate pad. Therefore, a source pad contact hole, connecting the source bus line with the source pad, can be formed directly by patterning a protection layer rather than the two time patterning of the conventional art. Moreover, a gate contact hole, connecting a gate pad with an external terminal, can be formed directly by patterning a gate insulating layer and a protection layer simultaneously. As a result, patterning steps such as cutting the shorting bar and forming gate and source pad contact holes can be eliminated.

In the present invention, the prevention of hill-lock on the aluminum layer is achieved by using a second metal layer covering the aluminum layer instead of anodizing the aluminum layer. In other words, the gate bus line includes a low resistance metal layer with less surface stability and a high resistance protective metal layer with better surface stability. Additionally, the metal layer for the gate pad and the source pad is connected with the conductive material for the pad connecting terminal.

More specifically, a first metal is vacuum deposited on a substrate and patterned by using a first mask to form gate bus lines. A second metal is vacuum deposited on the substrate including the gate bus lines and patterned by using a second mask to form gate electrodes and gate pads. In addition, second gate bus lines are formed above and covering the gate bus lines. An insulating material is vacuum deposited on the surface including the gate electrodes, the second gate bus lines and the gate pads to form a gate insulating layer. A semiconductor material and an impure semiconductor material are sequentially deposited on the surface of the gate insulating layer and patterned by using a third mask to form a semiconductor layer and an impure semiconductor layer. A third metal is vacuum deposited on the surface including the semiconductor layer and patterned by using a fourth mask to form source electrodes, drain electrodes, source bus lines and source pads. An insulating material is vacuum deposited on the surface including the source electrodes to form a protection layer. Then, using a fifth mask, a contact hole is formed on the drain electrodes and the source pads, respectively, by removing the protection layer and a contact hole is formed on the gate pads by removing the gate insulating layer and the protection layer. A conductive material is vacuum deposited on the resultant surface including the protection layer and patterned by using a sixth mask to form pixel electrodes connected with the drain electrodes, gate pad connecting terminals connected with the gate pads, and source pad connecting terminals connected with the source pads through the contact hole. Thus, the present invention provides an active panel with six mask steps. The method of the present invention is described in more detail with reference to the followings preferred embodiments.

With reference to FIG. 3 and FIGS. 4A–4F (FIGS. 4A–4F are sectional views taken along line IV—IV in FIG. 3), the method of manufacturing the active panel of an AMLCD according to a first embodiment of the present invention is described.

Figure 4A:
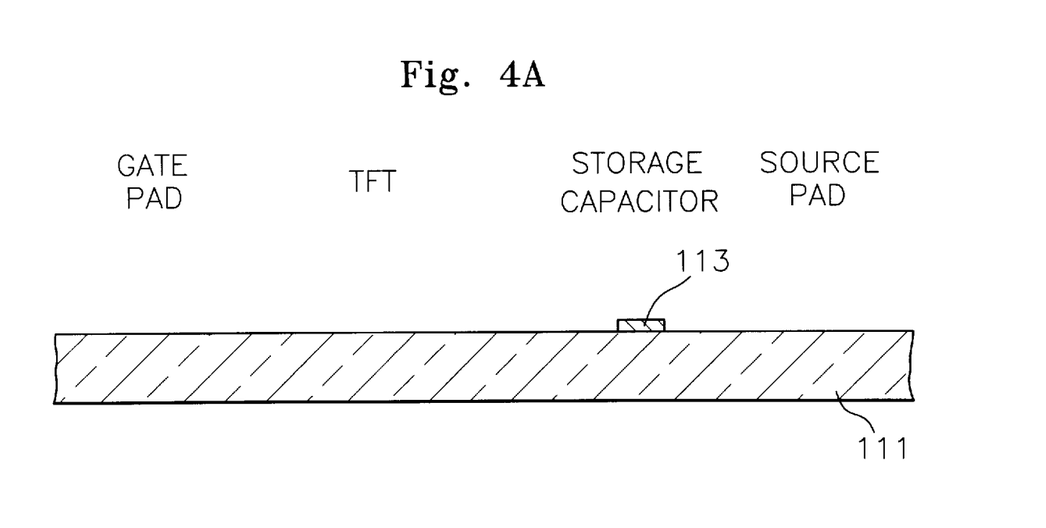
FIGS. 4A–4F are cross-sectional views showing the steps of manufacturing an active panel of a liquid crystal display device according to the first embodiment of the present invention.

As shown in FIG. 4A, aluminum or aluminum alloy is vacuum deposited on a transparent glass substrate 111 and patterned by using a first mask to form gate bus lines 113. Here, the gate bus lines 113 may be used to form storage capacitor electrodes.

Figure 4B:
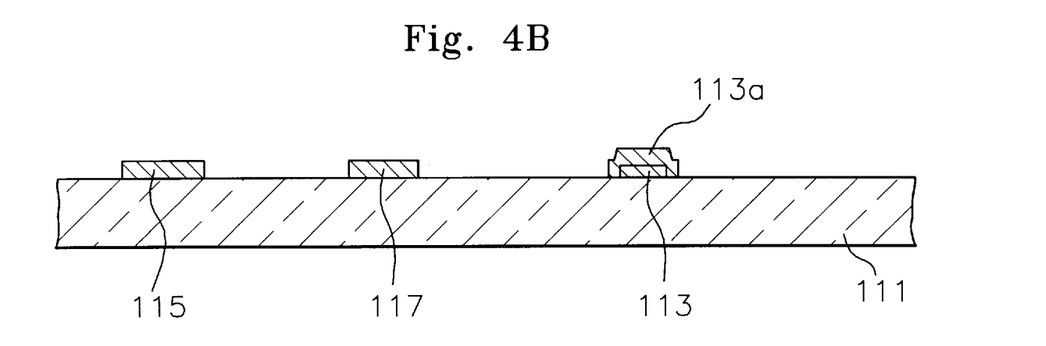

Next, as shown in FIG. 4B, a metal such as chromium, molybdenum, tantalum or antimony is vacuum deposited on the substrate including the gate bus lines 113, and patterned by using a second mask to form gate electrodes 117 and gate pads 115 at the end portion of the gate lines 113. At the same time, second gate bus lines 113a are formed to cover the gate bus lines 113 with metal such as chromium, molybdenum, tantalum or antimony to eliminate hill-lock effect on the aluminum surface. Therefore, a shorting bar is not needed in the present invention, since it is not necessary for the gate electrodes 117 and gate bus lines 113 to be anodized.

Figure 4C:
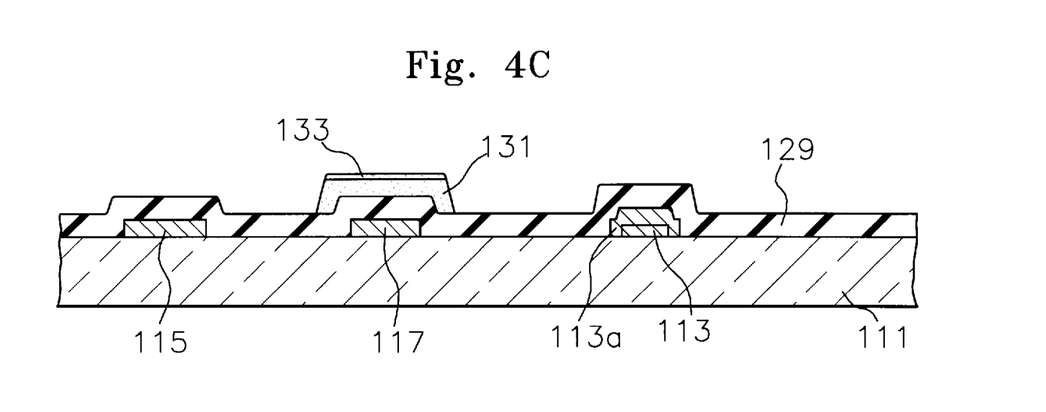

As shown in FIG. 4C, an insulating material, such as silicone oxide or silicone nitride, is vacuum deposited on the resultant surface including the second gate bus lines 113a to form a gate insulating layer 129. A semiconductor material and an impure semiconductor material are vacuum deposited sequentially on the surface of the insulating layer 129 and patterned by using a third mask to form a semiconductor layer 131 and an impure semiconductor layer 133.

Figure 4D:
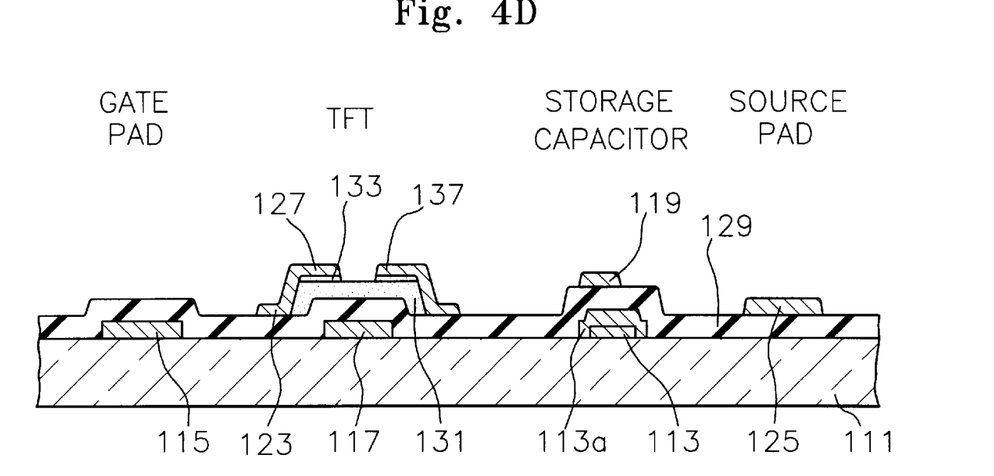

As shown in FIG. 4D, chromium or chromium alloy is vacuum deposited on the insulating layer 129 including the impure semiconductor layer 133, and patterned by using a fourth mask to form source electrodes 127, drain electrodes 137, source bus lines 123, storage electrodes 119 and source pads 125. Subsequently, using the source electrodes 127 and the drain electrodes 137 as masks, the exposed portion of the impure semiconductor layer 133 between the source electrodes 127 and the drain electrodes 137 is removed. As a result, the source electrodes 127 and drain electrodes 137 are formed at opposite positions, respectively, over the gate electrodes 117. The source bus lines 123 connect source electrodes 127 formed in a row direction. The storage capacitor electrode of the pixel at (n)th row is formed to overlap the gate bus line 113 and the second gate bus line 113a at (n−1)th row.

Figure 4E:
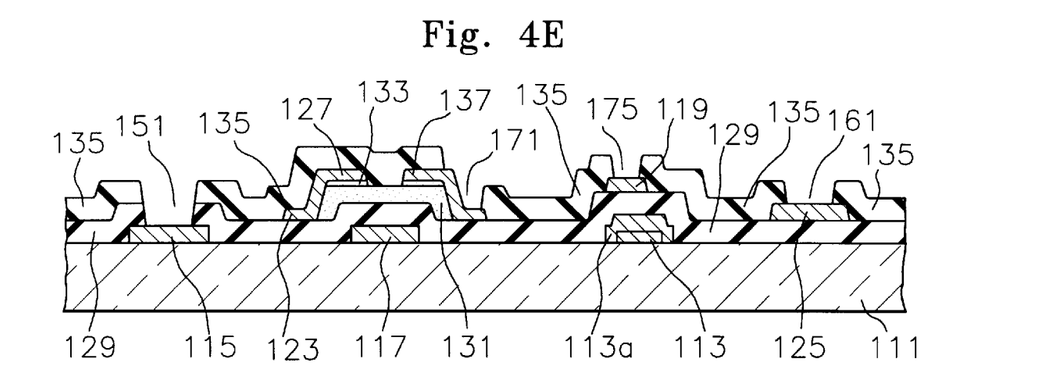

As shown in FIG. 4E, an insulating material such as silicone nitride or silicone oxide is vacuum deposited on the surface including the source electrodes 127 and drain electrodes 137 to form a protection layer 135. The protection layer 135 is then patterned by using a fifth mask to form a drain contact hole 171 over the drain electrode 137 and a source contact hole 161 over the source pad 125. At the same time, the protection layer 135 and the gate insulating layer 129 over the gate pad are removed to form a gate contact hole 151. At the region where the storage capacitor is to be formed, the protection layer 135 is removed to form a storage capacitor contact hole 175.

Figure 4F:
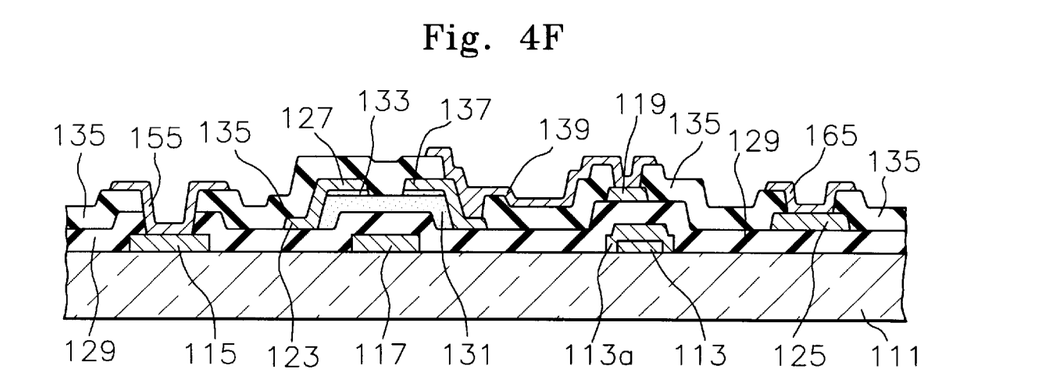

As shown in FIG. 4F, indium-tin oxide is vacuum deposited on the entire resultant surface including the protection layer 135 and patterned by using a sixth mask to form pixel electrodes 139. The pixel electrodes 139 are connected with the drain electrode 137 through the drain contact hole 171 and connected with the storage capacitor electrode 119 through the storage capacitor contact hole 175. At the same time, a source pad connecting terminal 165 is formed from the patterned indium-tin oxide layer and connected with the source pad 125 through the source contact hole 161. Similarly, a gate pad connecting o terminal 155 is formed from the patterned indium-tin oxide layer and connected with the gate pad 115 through the gate contact hole 151.

With reference to FIG. 3 and FIGS. 5A–5F (FIGS. 5A–5F are sectional views taken along line IV—IV in FIG. 3), the method of manufacturing the active panel of an AMLCD according to a second embodiment of the present invention is described.

Figure 5A:
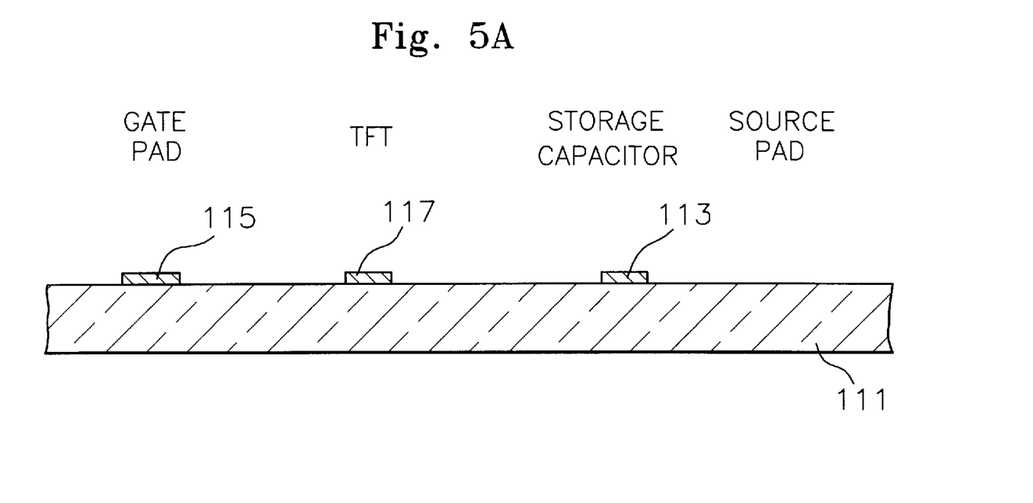
FIGS. 5A–5F are cross-sectional views showing the steps of manufacturing an active panel of a liquid crystal display device according to a second embodiment of the present invention.

As shown in Fig. 5A, aluminum or aluminum alloy is vacuum deposited on a transparent glass substrate 111 and patterned by using a first mask to form gate bus lines 113, gate electrodes 117 and gate pads 115.

Figure 5B:
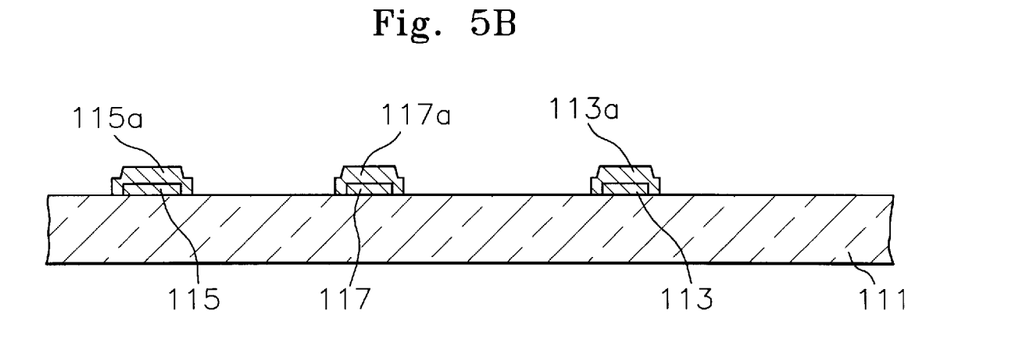

Next, as shown in FIG. 5B, a metal such as chromium, molybdenum, tantalum or antimony is vacuum deposited on the substrate including the gate bus line 113, gate electrodes 117 and gate pads 115, and patterned by using a second mask to form second gate bus lines 113a, second gate electrodes 117a, and second gate pads 115a covering the gate bus line 113, gate electrodes 117 and gate pads 115, respectively, in order to eliminate hill-lock on the aluminum surface. Therefore, a shorting bar is not needed in the present invention, since it is not necessary for the gate electrodes 117, gate bus lines 113 and gate pads 115 to be anodized.

Figure 5C:
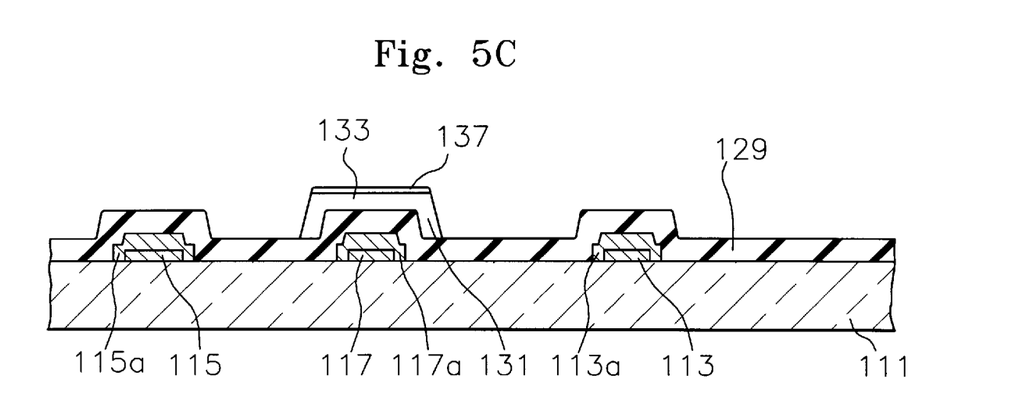

As shown in FIG. 5C, an insulating material such as silicone oxide or silicone nitride is vacuum deposited on the resultant surface including the second gate bus lines 113a to form a gate insulating layer 129. A semiconductor material and an impure semiconductor material are vacuum deposited sequentially on the surface of the insulating layer 129 and patterned by using a third mask to form a semiconductor layer 131 and an impure semiconductor layer 133.

Figure 5D:
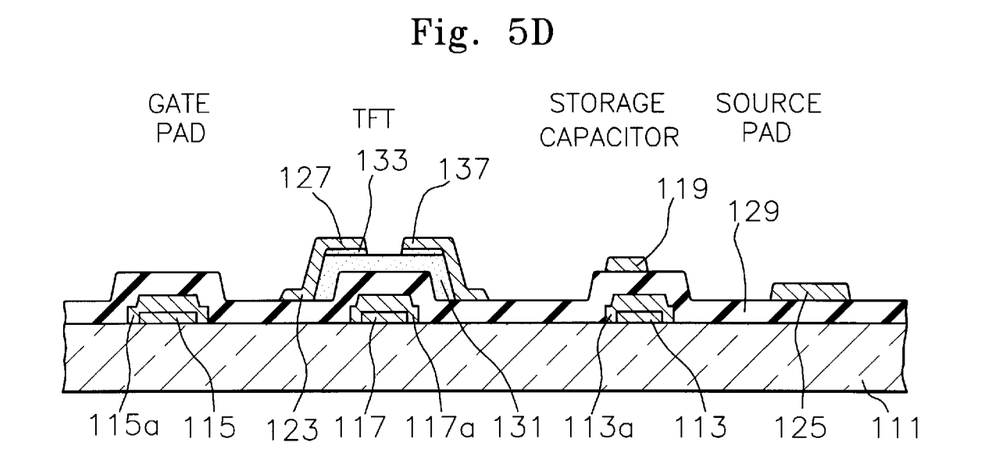

As shown in Fig. 5D, chromium or chromium alloy is vacuum deposited on the insulating layer 129 including the impure semiconductor layer 133, and patterned by using a fourth mask to form source electrodes 127, drain electrodes 137, source bus lines 123, storage electrodes 119 and source pads 125. Subsequently, using the source electrodes 127 and the drain electrodes 137 as masks, the exposed portion of the impure semiconductor layer 133 between the source electrodes 127 and the drain electrodes 137 is removed. As a result, the source electrodes 127 and drain electrodes 137 are formed at opposite positions, respectively, over the gate electrodes 117. The storage capacitor electrode for the pixel at (n)th row is formed to overlap the gate bus line 113 at (n−1)th row.

Figure 5E:
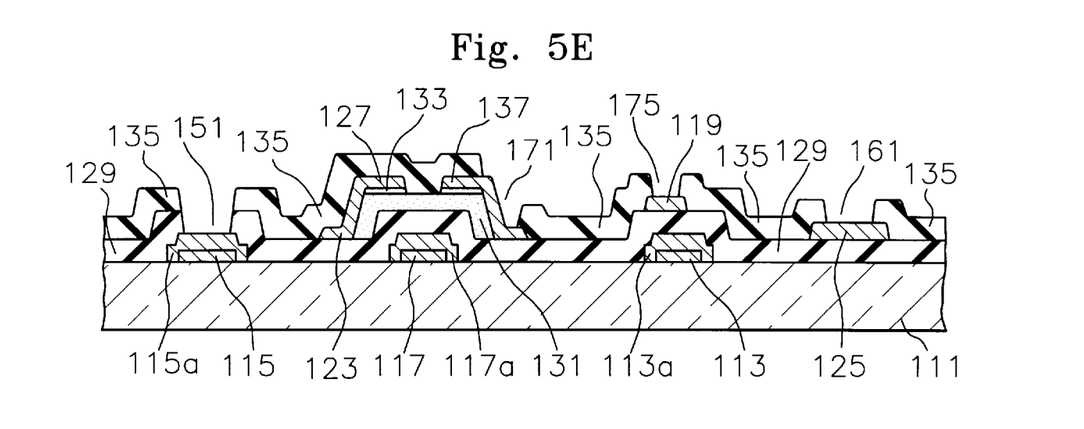

As shown in FIG. 5E, an insulating material such as silicone nitride or silicone oxide is vacuum deposited on the surface including the source electrodes 127 and drain electrodes 137 to form a protection layer 135. The protection layer 135 is patterned by using a fifth mask to form a drain contact hole 171 over the drain electrode 137 and a source contact hole 161 over the source pad 125. At the same time, the protection layer 135 and the gate insulating layer 129 over the gate pad are removed to form a gate contact hole 151. At the region where the storage capacitor is to be formed, the protection layer 135 is removed to form a storage capacitor contact hole 175.

Figure 5F:
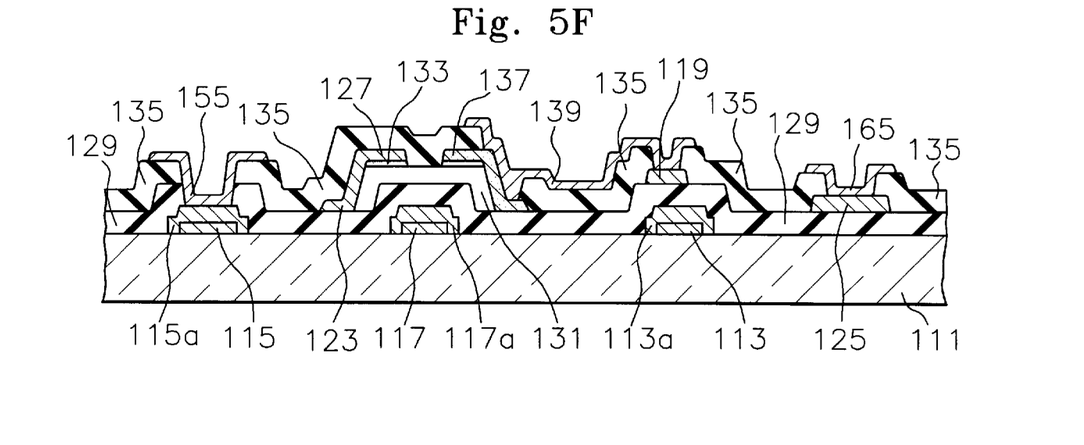
Figure 6:
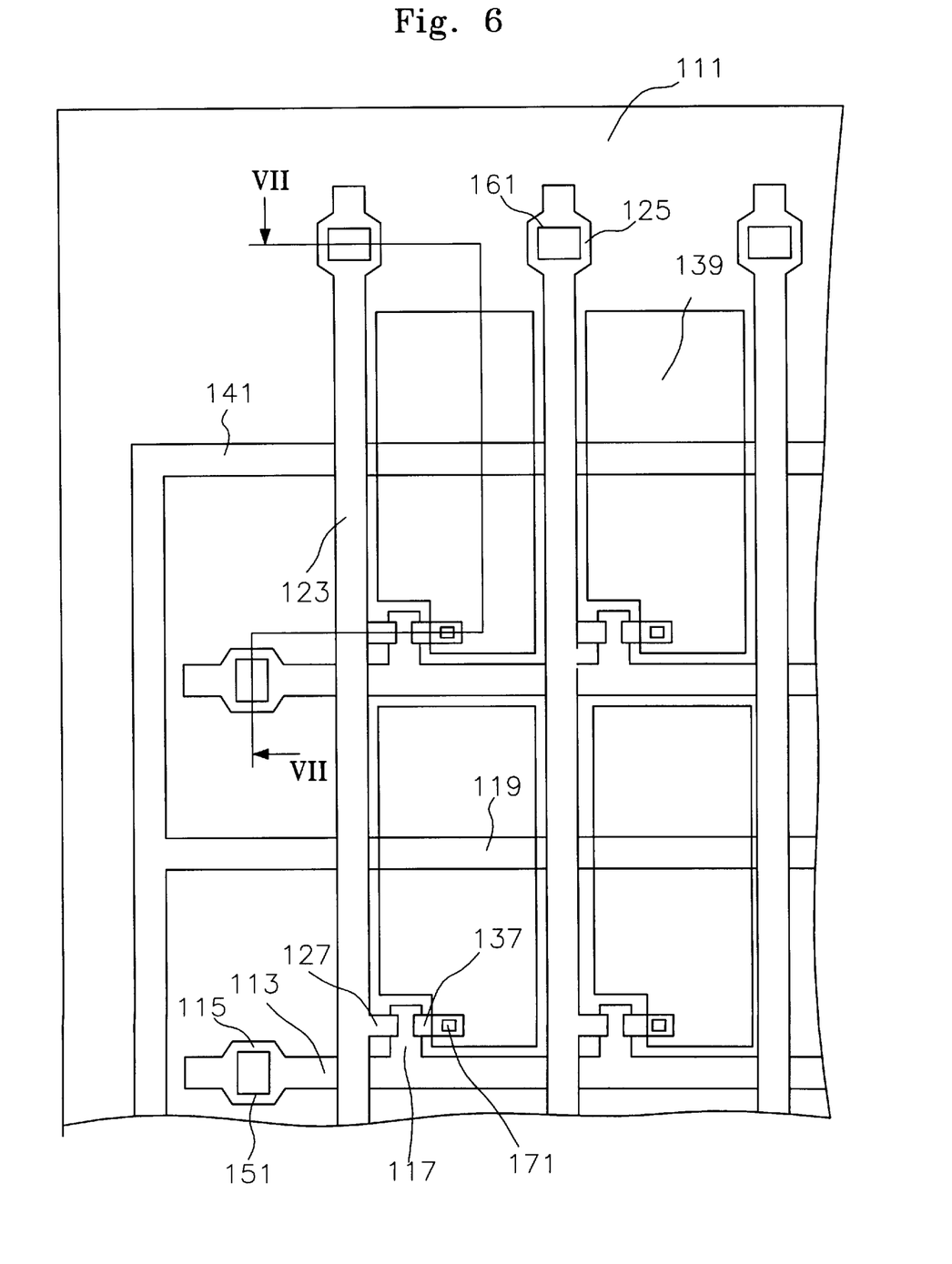
FIG. 6 is an enlarged plan view showing a part of an active panel of a liquid crystal display device according to a third embodiment of the present invention.

Finally, as shown in Fig. 5F, indium-tin oxide is vacuum deposited on the entire resultant surface including the protection layer 135 and patterned by using a sixth mask to form pixel electrodes 139. The pixel electrodes 139 are connected with the drain electrode 137 through the drain contact hole 171 and connected with the storage capacitor electrode 119 through the storage capacitor contact hole 175. At the same time, a source pad connecting terminal 165 is formed from the indium-tin oxide material and connected with the source pad 125 through the source contact hole 161. Similarly, a gate pad connecting terminal 155 is formed from the indium-tin oxide material and connected with the gate pad 115 through the gate contact hole 151.

With reference to FIG. 6 and FIGS. 7A–7F (FIGS. 7A–7F are sectional views taken along line VII—VII in FIG. 6), the method of manufacturing the active panel of an AMLCD according to a third embodiment of the present invention is described. This is an example of a method for forming the storage capacitor line separately in the device of the first embodiment. It is, of course, evident that this can be applied to the method of the second embodiment as well.

Figure 7A:
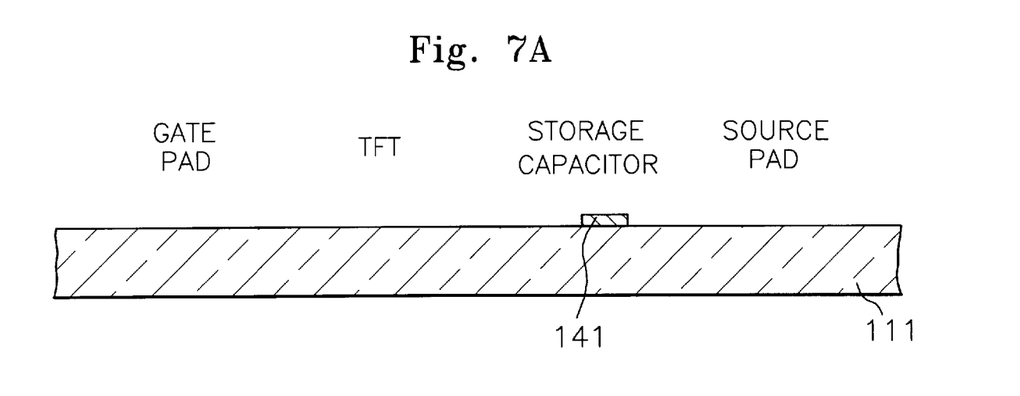
FIGS. 7A–7F are cross-sectional view showing the steps of manufacturing an active panel of a liquid crystal display device according to the third embodiment of the present invention.

As shown in FIG. 7A, aluminum or aluminum alloy is vacuum deposited on a transparent glass substrate 111 and patterned by using a first mask to form gate bus lines 113. Here, storage capacitor lines 141 are formed during the patterning of the aluminum layer, parallel with the gate bus lines 113 and in a position to cross the pixels (see FIG. 6).

Figure 7B:
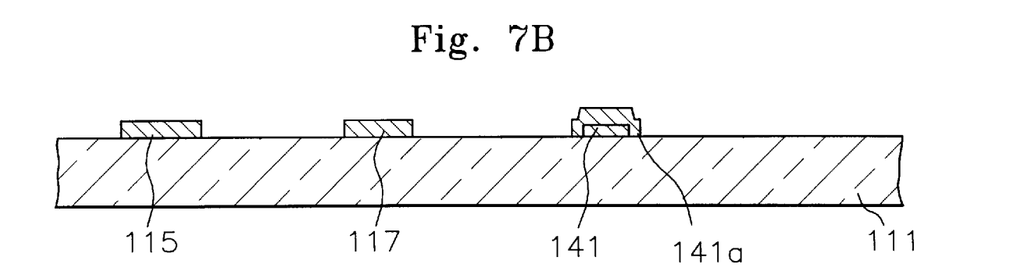

As shown in FIG. 7B, a metal such as chromium, molybdenum, tantalum or antimony is vacuum deposited on the substrate including the gate bus lines 113, and patterned by using a second mask to form gate electrodes 117 and gate pads 115 at the end portion of the gate lines 113. At the same time, second gate bus lines (not shown) are formed to cover the gate bus lines 113 made of aluminum. The second gate bus lines are made of metal such as chromium, molybdenum, tantalum or antimony to eliminate hill-lock effect on the aluminum surface. Here, second storage capacitor lines 141a are formed to cover the storage capacitor line 141 during the formation of the second gate bus lines. Therefore, a shorting bar is not needed in the present invention, since it is not necessary for the gate electrodes 117 and gate bus lines 113 to be anodized.

Figure 7C:
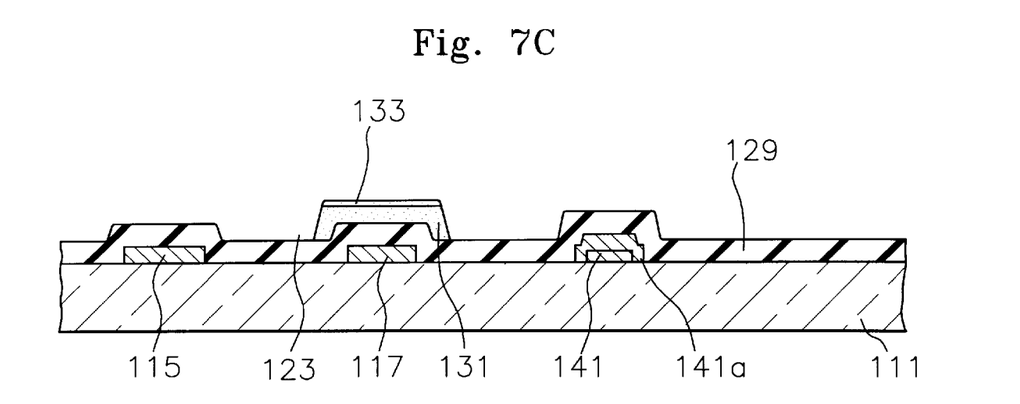

As shown in FIG. 7C, an insulating material such as silicone oxide or silicone nitride is vacuum deposited on the resultant surface including the second gate bus lines 113a, the storage capacitor lines 141 and the second storage capacitor lines 141a to form a gate insulating layer 129. A semiconductor material and an impure semiconductor material are vacuum deposited sequentially on the surface of the insulating layer 129 and patterned by using a third mask to form a semiconductor layer 131 and an impure semiconductor layer 133.

Figure 7D:
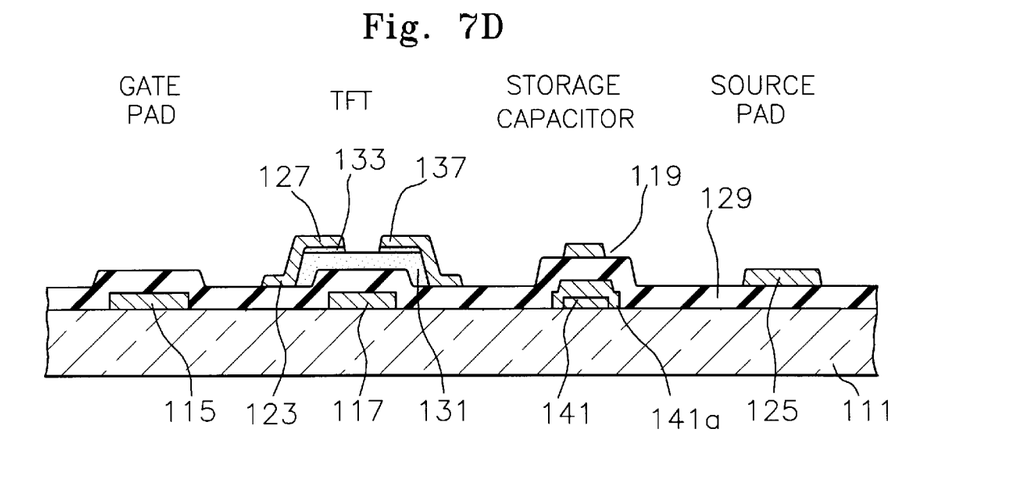

As shown in FIG. 7D, chromium or chromium alloy is vacuum deposited on the insulating layer 129 including the impure semiconductor layer 133, and patterned by using a fourth mask to form source electrodes 127, drain electrodes 137, source bus lines 123, and source pads 125. Here, storage capacitor electrodes 119 are formed to overlap the storage capacitor lines 141 and the second storage capacitor lines 141a. Subsequently, using the source electrodes 127 and the drain electrodes 137 as masks, the exposed portion of the impure semiconductor layer 133 between the source electrodes 127 and the drain electrodes 137 is removed.

Figure 7E:
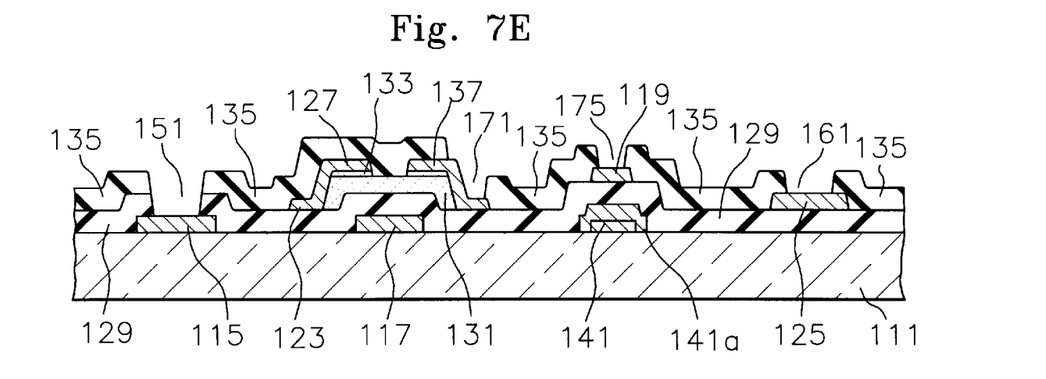

As shown in FIG. 7E, an insulating material such as silicone nitride or silicone oxide is vacuum deposited on the surface including the source electrodes 127 and drain electrodes 137 to form a protection layer 135. The protection layer 135 is then patterned by using a fifth mask to form a drain contact hole 171 over the drain electrode 137 and a source contact hole 161 over the source pad 125. At the same time, the protection layer 135 and the gate insulating layer 129 over the gate pad are removed to form a gate contact hole 151. At the region where the storage capacitor line 119 is formed, the protection layer 135 is removed to form a storage capacitor contact hole 175.

Figure 7F:
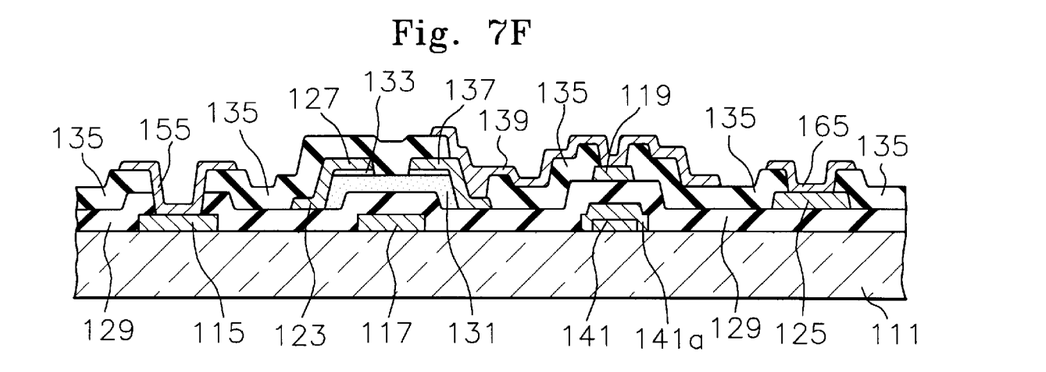

As shown in FIG. 7F, indium-tin oxide is vacuum deposited on the entire resultant surface including the protection layer 135 and patterned by using a sixth mask to form pixel electrodes 139. The pixel electrodes 139 are connected with the drain electrode 137 through the drain contact hole 171 and connected with the storage capacitor electrode 119 through the storage capacitor contact hole 175. At the same time, a source pad connecting terminal 165 is formed from the indium-tin oxide material and connected with the source pad 125 through the source contact hole 161. Similarly, a gate pad connecting terminal 155 is formed from the indium-tin oxide material and connected with the gate pad 115 through the gate contact hole 151.

It will be apparent to those skilled in the art that various modifications and variations can be made in the liquid crystal display and the method of manufacturing of the present invention without departing from the spirit or scope of the invention. Thus, it is intended that the present invention cover the modifications and variations of this invention provided they come within the scope of the appended claims and their equivalents.

What is claimed is:

1. A method for manufacturing a liquid crystal display comprising the steps of:

forming a first gate bus line on a substrate;

forming a second gate bus line directly on the first gate bus line, wherein the first gate bus line includes a first metal layer with a first resistance, and the second gate bus line includes a second metal layer with a second resistance, the second resistance being higher than the first resistance;

forming a gate insulating layer, a semiconductor layer and an impure semiconductor layer on the substrate;

forming a source electrode and a drain electrode on the impure semiconductor layer;

forming a protection layer covering the source electrode and the drain electrode;

forming a drain contact hole for exposing the drain electrode; and forming a pixel electrode which is connected with the drain electrode through the drain contact hole.

2. The method according to claim 1, wherein the step of forming the second gate bus line also forms a gate electrode protruding from the second gate bus line and a gate pad at the end of the second gate bus line;

wherein the step of forming the drain contact hole also forms a gate pad contact hole for exposing the gate pad; and wherein the step of forming the pixel electrode also forms a gate pad connecting terminal which is connected with the gate pad through the gate pad contact hole.

3. The method according to claim 1, wherein the step of forming the first gate bus line also forms a first gate electrode protruding from the first gate bus line and a first gate pad at the end of the first gate bus line;

wherein the step of forming the second gate bus line also forms a second gate electrode covering the first gate electrode and a second gate pad covering the first gate pad;

wherein the step of forming the drain contact hole also forms a gate pad contact hole for exposing the second gate pad; and wherein the step of forming the pixel electrode also forms a gate pad connecting terminal which is connected with the second gate pad through the gate pad contact hole.

4. The method according to claim 1, wherein the step of forming the source electrode also forms a source bus line connecting the source electrode and a source pad at the end of the source bus line;

wherein the step of forming the drain contact hole also forms a source pad contact hole for exposing the source pad; and wherein the step of forming the pixel electrode also forms a source pad connecting terminal which is connected with the source pad through the source pad contact hole.

5. The method according to claim 1, wherein the step of forming the source electrode also forms a storage capacitor electrode over selective part of the second gate bus line;

wherein the step of forming the drain contact hole also forms a storage capacitor contact hole for exposing the storage capacitor electrode; and wherein the pixel electrode is connected with the storage capacitor electrode through the storage capacitor contact hole.

6. The method according to claim 1, wherein the step of forming the first gate bus line further forms a storage capacitor line parallel with the first gate bus line;

wherein the step of forming the source electrode further forms a storage capacitor electrode to overlap some part of the storage capacitor line;

wherein the step of forming the drain contact hole also forms a storage capacitor contact hole for exposing the storage capacitor electrode; and wherein the pixel electrode is connected with the storage capacitor electrode through the storage capacitor contact hole.

7. The method according to claim 1, wherein the first gate bus line includes one of aluminum and aluminum alloys.

8. The method according to claim 1, wherein the second gate bus line includes one of chromium, molybdenum, tantalum and antimony.

9. The method according to the claim 1, wherein the pixel electrode includes indium-tin-oxide.

* * * * *